United States Patent [19]

Hait

[11] Patent Number: 5,466,925
[45] Date of Patent: Nov. 14, 1995

[54] AMPLITUDE TO PHASE CONVERSION LOGIC

[75] Inventor: John N. Hait, Missoula, Mont.

[73] Assignee: Rocky Mountain Research Center, Missoula, Mont.

[21] Appl. No.: 413,130

[22] Filed: Mar. 27, 1995

Related U.S. Application Data

[63] Continuation-in-part of Ser. No. 357,460, Dec. 16, 1994.

[51] Int. Cl.$^6$ .................... G06G 7/00; G06E 1/04
[52] U.S. Cl. ................... 250/216; 250/214 LS; 359/15; 359/108; 364/713; 364/807
[58] Field of Search ............... 250/216, 214 LS, 250/214 DC; 359/1, 15, 107, 108, 577; 364/807, 826, 822, 837, 845, 713

[56] References Cited

U.S. PATENT DOCUMENTS

| | | | |
|---|---|---|---|
| 3,680,080 | 7/1972 | Maure | 250/214 LS |
| 4,084,880 | 4/1978 | Clow | 359/15 |
| 4,386,414 | 5/1983 | Case | 359/15 |
| 4,703,993 | 11/1987 | Hinton et al. | 359/15 |
| 4,764,889 | 8/1988 | Hinton et al. | 359/15 |
| 4,764,890 | 8/1988 | Hinton | 359/15 |
| 4,824,192 | 4/1989 | Roberts | 364/713 |
| 4,830,444 | 5/1989 | Cloonan et al. | 359/107 |
| 5,093,802 | 3/1992 | Hait | 364/807 |
| 5,239,173 | 8/1993 | Yang | 250/214 LS |

Primary Examiner—Edward P. Westin
Assistant Examiner—John R. Lee
Attorney, Agent, or Firm—Leonard D. Schappert

[57] ABSTRACT

A means, method and apparatus is disclosed for providing at least one phase-modulated output from at least one amplitude-modulated input, which is used to produced the logical AND and OR functions having phase modulated outputs. A constant level bias beam set of at least one wavelength of any wave-type energy is superimposed on at least one modulated input beam set having an energy sum out of phase with the bias beam set at at least one location. Energy in the resulting interference image is separated from said at least one location to produce at least one output. Input levels determine the function performed. When the input energy sum is greater than the bias beam set, the output changes phase. When they are equal, the output is zero, which is also used to produce the NAND function.

8 Claims, 1 Drawing Sheet

5,466,925

AMPLITUDE TO PHASE CONVERSION LOGIC

REFERENCE DATA

This application is a continuation-in-part of U.S. application Ser. No. 08/357,460, filed Dec. 16, 1994.

BACKGROUND OF THE INVENTION

1. Technical Field

The present invention relates to optical computers and basic optical logic functions, such as the NAND, AND, and OR, to amplitude-to-phase converters, using wave-type beams, including electromagnetic waves, acoustical waves, and moving particles.

2. Background Art

My U.S. Pat. No. 5,093,802 contains the primary background art for the present invention. It uses interference between modulated and unmodulated input beams of wave-type energy. The functions are defined in terms of constructive and destructive interference component regions at a fringe component separator, such as a mask, which is used to separate energy from at least one component region to provide at least one amplitude-modulated output.

That patent provides several logic elements, including a two-input OR, an EXCLUSIVE OR, an inverter and an amplifier, all having amplitude-modulated outputs. Absent from the prior art are three important logic elements, namely the logical NAND, the logical AND, and a multi-input OR, along with a means and method of producing a useful output from these functions.

The remainder of the prior art, such as U.S. Pat. No. 5,239,173 by Yang, uses "sensors" and other non-interference means in order to accomplish the AND function, whereas the present invention uses interference to accomplish that process. Yang does not provide for a NAND or a multi-input OR.

SUMMARY OF THE INVENTION

The present invention comprises a means and method of providing either a phase-modulated, or amplitude-modulated output from amplitude-modulated inputs. It provides the NAND, AND and OR functions by properly selecting the binary input levels of a single arrangement.

Concerning the AND and the OR, it overcomes the limitations of the prior art by providing a means and method of producing logical components that have amplitude-modulated inputs, but phase-modulated outputs. By providing phase-modulated outputs rather than the amplitude-modulated outputs of the prior art, multi-input ANDs and ORs can be provided. The phase-modulated outputs can be further processed by other components.

The output phase of the AND and OR switches by 180 degrees to indicate the binary state resulting from the particular logic function. One phase is the "off" phase, and the opposite phase is the "on" phase, regardless of the amplitude.

This means and method provides information in the output signals which indicates the results of the logic action that has been performed, while allowing other components to be used to interface logic stages by removing any modulation component that may be detrimental to the operation of a succeeding stage.

The present invention can be accomplished using any wave-type energy that produces interference, including acoustical waves, moving particle waves, and electromagnetic waves. For the sake of consistency and understandability of the disclosure, optical terminology will be used. The present invention can be used with both Young's type interference, (conventional interference using type of interferometer,) and the "special interference" described in U.S. application Ser. No. 08/357,460.

Holograms produce interference images from multiple beams or sets of beams. Since holograms and, in particular, computer-generated holograms, are a convenient way of implementing the present invention, inputs to the invention are in sets of beams that are modulated together as if they were a single beam. This is done because many rays or beams combine to produce an interference image or fringe when making a hologram. Groups or sets of input beams then function in unison to produce various interference image patterns that determine the outputs.

The basic means and method of the present invention includes the following steps:

1. A bias beam set is provided having at least one beam of energy having at least one wavelength, maintained at a substantially constant level.

2. A plurality of input beam sets are provided, each having at least one beam of energy of said at least one wavelength, in phase with each other, and out of phase with the bias beam set, each of the input beam sets being amplitude-modulated with binary information and having an energy sum.

3. The beam sets are superimposed to produce interference between the input beam sets and the bias beam set at at least one location.

4. An image component separator is used to separate energy from the at least one location to provide at least one phase-modulated output.

Because all of the input beam sets are in phase with each other but out of phase with the bias beam set, the output phase will depend on the amplitude of the energy sum as compared to the amplitude of the bias beam set. When the energy sum of the plurality of input beam sets is greater than the amplitude of the bias beam set, the phase of the output will be opposite that of the bias beam set. When the amplitude of the bias beam set is larger than the energy sum of the plurality of input beam sets, the output will be in phase with the bias beam set. All phases are measured at the at least one location where separation of the interference image occurs.

If only one of the plurality of input beam sets is used as the amplitude-modulated input, the output will be phase-modulated when the amplitudes of the bias beam set and the single input beam set are not equal. If that particular input beam set is modulated with binary information and the bias beam set has an amplitude which is one-half of the amplitude of the input beam set, the phase-modulated output will have no amplitude modulation component, but will be completely phase-modulated. This is because the output amplitude vectors in each of the binary states are equal in amplitude but of opposite phase.

To produce a logical AND having binary amplitude-modulated inputs and a phase-modulated output, the plurality of input beam sets function as AND inputs. The substantially constant level of the bias beam set is set at a level that is less than the energy sum of the AND inputs when all of the AND inputs are on, and greater than the energy sum of the AND inputs when all but one of the AND inputs are on.

As a result, the output will be of one phase when all of the AND inputs are on, and of the other phase when one or more of the AND inputs is off.

To produce a logical OR having multiple, binary, amplitude-modulated inputs and a phase-modulated output, the plurality of input beam sets function as OR Inputs. The substantially constant level of the bias beam set is held at a level that is less than the energy sum of the OR inputs when only one of the OR inputs is on, and greater than zero. As a result, the output will be of one phase when at least one of the OR inputs is on, and of the opposite phase when all of the OR inputs are off.

The image component separator can be constructed of any optical element or combination of optical elements, including masks and holograms that permit energy at the at least one location to go into the at least one output, while preventing energy from other parts of the interference image from being a part of the output.

The NAND function is produced by carefully balancing the input levels so that when all of the plurality of input beam sets are on, the energy sum balances the bias beam set so that the at least one output is off at a low level. And when at least one of the plurality of input beam sets is off, the output goes to a higher level. As a result, the NAND has an amplitude-modulated output, whereas the AND and the OR have phase-modulated outputs.

At least one wavelength of energy is required for each logic action. When more than one wavelength is provided, multiple, simultaneous, independently operating logic actions can be produced within a single device.

The basic operating principles of the present invention are discussed in U.S. application Ser. No. 08/357,460, referenced above, of which this application is a continuation-in-part. A selected portion of that applications is reproduced below which is a discussion of the "principle of input beam summing" as used in conjunction with a threshold detector. For that reason, in this discussion, the "bias" beam set referred to above is the same as the "threshold-controlling inputs" below, and the "inputs" above are the same as the "trigger inputs" below. The terms "bias" and "inputs" are used in the present application because they are shorter, better suited to and more descriptive of the present invention.

As is noted in application Ser. No. 08/357,460:

"The summing (third) location(s) operate in a special way that makes threshold detection possible. There are two types of input beam sets to the summing location(s). The first type are "trigger inputs", and the second are "threshold-controlling inputs." These two types are 180 degrees out of phase with each other. In complex arrangements, some of these input beams have special assignments, and are given special names such as "set" or "reset" inputs, yet they provide energy that is in phase with one type or the other.

Under the principle of superposition, the amplitudes of the superimposed beams add algebraically. The sum of all trigger beams balances the sum of all threshold-controlling beams. The total algebraic sum of the two sums has the interesting and useful quality of being in phase with the threshold-controlling beams whenever the sum of all threshold-controlling beams is greater than the sum of all trigger beams. That total is out of phase with the threshold-controlling beams whenever the sum of all trigger beams is the greater. If the two sums are equal, the total sum is zero.

If any of the input beams were not zero or 180 degrees, a combination phase would result (with broad band optics). However, because the inputs are of one phase or the other, the sum will be only one phase or the other (or off if they balance).

If at least one of the threshold-controlling beams is held at a substantially constant level, and the level of the sum of the trigger beam(s) is increased from zero, the amplitude of the total sum will decrease, but its phase will remain the same as that of the threshold-controlling beam.

Energy from the summing location(s) is separated and directed into the control input of the amplifier, having a phase upon arriving that holds the amplifier at cutoff (uninverted output off). Because any sum that produces this same phase produces constructive interference at the first location(s), the input level to the amplifier has no effect. The amplifier remains in cutoff regardless of fluctuations in the input levels.

When the trigger input sum equals the threshold-controlling sum, the total sum is zero; as a result, the output of the amplifier remains cut off.

As the trigger sum rises above the level of the threshold-controlling sum, the total amplitude rises. However, its phase has switched 180 degrees, and is now in phase with the trigger sum. If the trigger sum raises rapidly, the phase of the total sum will not pass through all of the phases from zero to 180; rather, the phase jumps from zero to 180. This sudden phase change principle is used for threshold detection by detecting this phase change. As soon as the control input to the amplifier sees the new phase, destructive interference takes place at the first location(s), and energy appears in the uninverted output.

As long as the threshold-controlling input is held constant, it will establish the level at which this phase cross-over takes place. Without this balancing input, the amplifier will be sensitive to the slightest input; its threshold level is zero. However, adding the summing location(s) ahead of and outside of the amplifier allows a threshold to be established at some point above zero."

One of the objects of the present invention is to advance the technology necessary to build computers using wave energy such as light or acoustic energy.

Another of the objects of the present invention is to provide an amplitude-to-phase-modulation converter capable of utilizing wave energy to accomplish the conversion.

Another object of the present invention is to provide a multi-input AND utilizing wave energy.

A further object of the present invention is to provide a multi-input OR utilizing wave energy.

Another object of the present invention is to provide a logical NAND function utilizing wave energy.

Another object of the present invention is to provide a means and method of frequency multiplexed logic.

The foregoing objects and benefits of the present invention will become clearer through an examination of the drawings, description of the drawings, description of the preferred embodiment, and claims which follow.

Please note that the beam angles, sizes and proportions are exaggerated so as to provide for clarity of understanding.

DESCRIPTION OF THE PREFERRED EMBODIMENT

Figure 1:
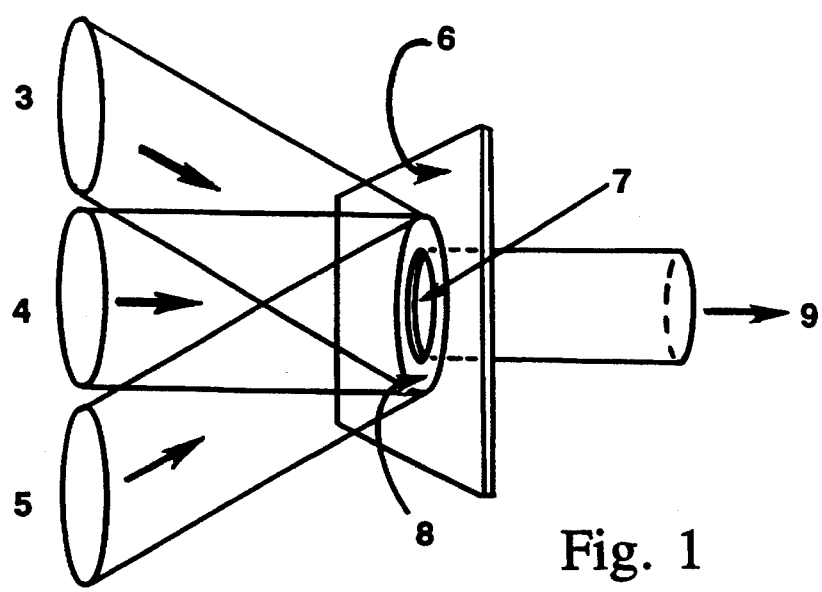
FIG. 1 shows an elementary amplitude to phase logic converter.

FIG. 1 shows three input beam sets. Beam set (3) and beam set (4) comprised of least one beam each, so that the "at least one beam" of each is shown in the drawing. Beam sets (3) and (4) are in phase with each other and represent the plurality of input beam sets that are to be balanced against bias beam set (5), which also comprises at least one beam.

Beam sets (3), (4), and (5) are superimposed at the location of an image component separator (6), which in this ease is constructed of a mask. When the modulation of beam sets (3) and (4) is such that the energy sum of the two is out of phase with bias beam set (5), destructive interference (DI) occurs at at least one location (7), which is also the location of (at least one) hole in mask (6).

Image component separator (6) blocks energy which is not a part of the DI portion of the fringe image (8). The hole at the at least one location (7) allows energy from the DI area to pass through the mask to provide at least one output (9).

Figure 2:
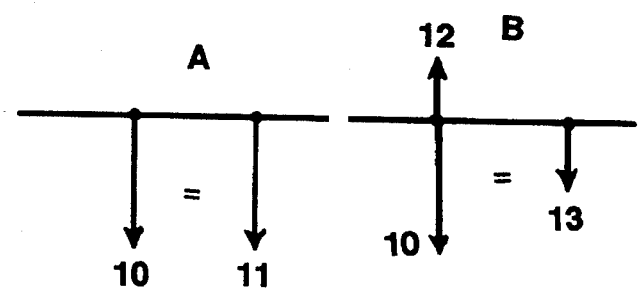
FIG. 2 shows graphs of beam set vector sums.
Figure 2:
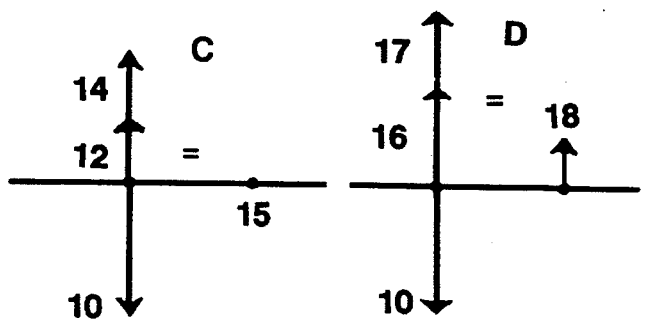
Figure 2:
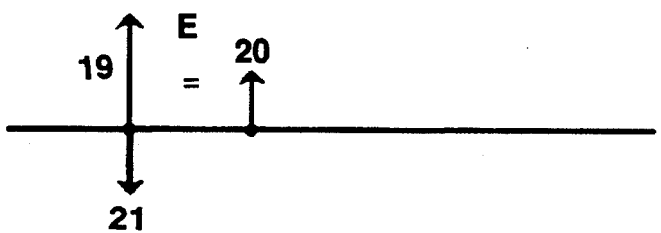

Image component separation is vital to the operation of the present invention. If the image component separator, be it a mask or some other optical element(s), did not separate energy from the DI area of the fringe, the remainder of the energy at fringe image (8) would mingle with the energy at location (7), and would destroy the phase relationships that the present invention maintains by separating the fringe image components. These phase relationships are shown in FIG. 2.

One important advantage to the present invention is its ability to use multiple wavelength energy, whereby independent logic actions can be produced within a single physical device. To provide multiple independent logic actions, each logic action to be performed uses a separate frequency (or wavelength.) The input beam sets react with the portion of the bias beam set that has that same wavelength. By using multiple wavelengths, one for each logic action, the result is frequency multiplexed logic.

For example, a logical AND (as described above) having eight different wavelengths can produce logic operations on an entire byte of information, simultaneously and in parallel. In fact, because the exact logic operation performed in the present invention is a function of the relative beam levels, one frequency can perform the multi-input OR, while another an AND, and still another some prior art interference based function, and so on. This is because the operation of each logic function depends only on the relationship of beams at that same frequency, independently of the other frequencies.

A close examination of classical white-light interference fringes reveals, that the interference images are merely overlapping fringes of the individual wavelengths that the white-light is comprised of. The component images for each color appear in the same places and in the same configurations that they do if each color is used separately. This indicates that information impressed on each frequency can be manipulated as a separate signal, producing separate interference images at a common location. The present invention uses this effect to produce separate logic actions without having to use physically separate devices, as long as the devices can be built with broad band optics.

Broad band optics to accommodate the many wavelengths needed for frequency multiplexed logic in the present invention can be constructed by aligning the multi-wavelength energy beam sets (both bias and input,) so that the DI component areas are superimposed onto the same location(s) on the image component separator where image component separation takes place. In moderately broadband arrangements, the overlap of the images is sufficiently small so that special optical arrangements (beyond what is needed to produce a basic embodiment,) will not be needed with the present invention in accommodate a considerable bandwidth. But as the component size shrinks, the image sizes become smaller and will require more precise image component separators, and beam combining optics, especially as those sizes approach wavelength sizes.

Very broad band arrangements of the present invention may require optics that are specifically designed for handling a group of moderate bandwidth arrangements, so that all of the images, where multiple separation locations are used, will be properly aligned with the beam combining optics.

Whether a particular embodiment of the present invention is designed to operate with a single wavelength, or many, the fundamental operation remains the same.

FIG. 2 shows five graphs of various input states that are used to provide logic action using the present invention. Compare FIG. 1 and FIG. 2. Graph (A) shows the bias beam set (5) vector (10). The input beam sets (3) and (4) are off, so the output (9) has the same amplitude and phase shown by vector (11) as bias beam set (5). The phase is measured at location (7) or at output (9), which is an integer multiple of wavelengths from location (7).

Graph (B) shows what happens when one of the input beams (3) comes on with an amplitude as shown by vector (12), which is smaller than amplitude shown by vector (10) of bias beam set (5). The phase of vector (12) is 180 degrees from the phase of bias beam set (5) as indicated by the opposite direction of vector (12) when compared to vector (10).

The algebraic sum of input beam set (3) and bias beam set (5) is shown by vector (13). While the amplitude is reduced from that shown by vector (10), the important principle used in the present invention is that the phase (direction) of vector (13) is still the same as the phase of vector (10).

Graph (C) is like (B), except that input beam set (4), as shown by vector (14), has also come on and is in phase with vector (12). In this case, the algebraic sum of vectors (12) and (14) is equal to, but of opposite phase from, the bias beam set vector (10). The output (9), as shown by vector (15), is zero.

This arrangement produces a logical NAND having an amplitude-modulated output because both input beam sets (3) and (4) must be on before the output (9) goes off. It should be noted that each of the embodiments of the present invention can have an amplitude-modulated component in the output. This is acceptable, as the present invention is made to be used with other devices that either can remove the amplitude-modulated components or are not adversely affected by it.

Graph (D) shows how the output phase changes in the present invention when it is used for producing a logical AND with a phase-modulated output. In this case the two input beam sets (3) and (4) have amplitudes as shown by vectors (16) and (17) that are each larger than one-half the amplitude of bias beam set (5) as shown by vector (10). The algebraic energy sum of the amplitudes produces an amplitude at output (9) as shown by vector (18). By comparing (A), (B) and (D), it can be seen that the phase of vector (18) is the opposite of the phase of either vector (11) or (13). This phase change provides the phase-modulated output signal that occurs only when both input beam sets (3) and (4) are on. As a result, the present invention provides a logical AND whereby the amplitude-modulated plurality of input beams produce a phase change in the output only when the conditions for AND logic are met. This occurs when the bias beam set is set to a level that is less than the energy sum of all of the input beam sets when all of the input beam sets are on, and greater than the energy sum of the input beam sets when one of the input beam sets is off and the rest are on.

Graph E shows how the present invention can be used as a multi-input OR with a phase changing output. In this case, the substantially constant level of the bias beam set (5) is vector (21) so that it is smaller than the energy sum of either input beam sets (3) or (4) when only one of the input beam sets is on and the other is off. When both input beam sets (3) and (4) are off, the output phase is the same as in (A). But when any one of the input beam sets comes on, as shown by vector (19) in (E), then the output phase switches as shown by vector (20).

Here, the phase change occurs when any one of the input beam sets is on, which produces a logical OR with a phase changing output. As with any of the above embodiments, a large number of input beam sets can be provided, and by adjusting the bias beam set accordingly, the arrangement can function as a multi-input OR, or a multi-input AND, a combination of the two, or a multi-input NAND.

Graph (E) can also represent the case where a single input beam set is used to produce a phase-modulated output from an amplitude-modulated input. When the input beam set is binary, setting the substantially constant level of the bias beam set (21) at one-half the amplitude of the input beam set (when on) the phase-modulated output will have equal amplitudes for each phase. In other words, the output will be phase-modulated, but there will be no amplitude-modulated component in the output waveform. When the input beam set is not binary, then the phase cross-over point can be set by setting the substantially constant level of the bias beam set (21).

While the foregoing description of the preferred embodiment of the present invention has disclosed specific constructions, means, and methods of accomplishing the present invention, because specific improvements and modifications will become readily apparent to those skilled in the art of computers and optical devices and the like, it is applicant's intent not to be limited by any of the foregoing descriptions, but only by the claims which follow.

What is claimed is:

1. A method of providing at least one phase-modulated output from at least one amplitude-modulated input comprising the following steps:

providing a bias beam set having at least one beam of energy of at least one wavelength maintained at a substantially constant level;

providing at least one input beam set, having at least one amplitude-modulated beam of energy of said at least one wavelength out of phase with said bias beam set, and having an energy sum;

superpositioning said bias beam set with said at least one input beam set to produce interference at at least one location when both said beam sets are on, and separating energy from said at least one location to provide at least one phase modulated output, thereby providing an amplitude modulation-to-phase modulation converter wherein the phase of said at least one phase-modulated output has a first phase when said energy sum is greater than the level of said bias beam set, and has a second phase when said energy sum is smaller than said bias beam set.

2. The invention of claim 1 including:

providing a plurality of said at least one input beam sets as AND inputs amplitude-modulated with binary information, said energy sum of said AND inputs being greater than said substantially constant level of said bias beam set when all said AND inputs are on and less than said substantially constant level of said bias beam set when one of said AND inputs is off and the remainder of said AND inputs are on, thereby providing a multi-input AND with a phase-modulated output having said first phase only when all said AND inputs are on.

3. The invention of claim 1 including:

providing a plurality of said at least one input beam sets as OR inputs amplitude modulated with binary information, said energy sum of said OR inputs being greater than said substantially constant level of said bias beam set when at least one of said OR inputs is on, thereby providing a multi-input OR by producing an output having said first phase when at least one of said OR inputs is on.

4. A method of providing the logical NAND function comprising the following steps:

providing a bias beam set having at least one beam of energy of at least one wavelength maintained at a substantially constant level;

providing a plurality of input beam sets, each having at least one amplitude-modulated beam of energy of said at least one wavelength out of phase with said bias beam set, and having an energy sum, said energy sum being substantially equal to said substantially constant level of said bias beam set when all of said plurality of input beam sets are on;

superpositioning said bias beam set with said plurality of input beam sets to produce interference at at least one location when both said beam sets are on, and separating energy from said at least one location to provide at least one output, thereby providing a logical NAND function by producing a low output when all of said plurality of input beam sets are on, and a higher output level when at least one of said plurality of input beam sets is off.

5. An amplitude modulation-to-phase modulation converter for use with wave energy comprising:

a bias beam set having at least one substantially constant level beam of energy of at least one wavelength, directed toward a first location;

at least one input beam set having at least one amplitude-modulated beam of energy of said at least one wavelength, directed toward said first location, said at least one amplitude-modulated beam of energy being out of phase with said bias beam set and having an energy sum, said bias beam set and said at least one input beam set producing interference at said first location when both are on, and an image component separator positioned at said first location for separating energy from said first location to provide at least one phase-modulated output, thereby providing an amplitude modulation-to-phase modulation converter wherein the phase of said at least one phase-modulated output has a first phase when said energy sum is greater than the level of said bias beam set, and has a second phase when said energy sum is smaller than said bias beam set.

6. The invention of claim 5, including:

a plurality of said at least one input beam sets, said plurality of said at least one input beam sets and said bias beam set each being of a level such that, when said plurality of said at least one input beam sets are amplitude-modulated with binary information, said energy sum of said plurality of said input beam sets is greater than said substantially constant level of said bias beam set when all of said plurality of said at least one input beam sets are on and less than said substantially constant level of said bias beam set when at least one of said plurality of said at least one input beam sets is off, thereby providing a multi-input AND with a phase-modulated output having said first phase only when all of said plurality of said at least one input beam sets are on.

7. The invention of claim 5, including:

a plurality of said at least one input beam sets, said plurality of said at least one input beam sets and said bias beam set each being of a level such that, when said plurality of said at least one input beam sets are amplitude-modulated with binary information and when at least one of said plurality of said at least one input beam sets is on, said energy sum of said plurality of said at least one input beam sets is greater than said substantially constant level of said bias beam set thereby providing a multi-input OR with an output having said first phase when at least one of said plurality of said at least one input beam sets is on.

8. A logical NAND which utilizes wave energy, comprising:

a bias beam set having at least one beam of energy of at least one wavelength, maintained at a substantially constant level, directed toward a first location;

a plurality of input beam sets, directed toward said first location, each having at least one amplitude-modulated beam of energy of said at least one wavelength, out of phase with said bias beam set and an energy sum, said energy sum being substantially equal to said substantially constant level of said bias beam set when all of said plurality of input beam sets are on, said bias beam set and said plurality of input beam sets producing interference at said first location, and an image component separator positioned at said first location for separating energy from said first location to provide at least one output, thereby producing a low output when all of said plurality of input beam sets are on and a higher output when at least one of said plurality of input beam sets is off.

* * * * *